(12) United States Patent
Lynn

(10) Patent No.: US 6,645,459 B2
(45) Date of Patent: Nov. 11, 2003

(54) METHOD OF RECOVERING SULFUROUS COMPONENTS IN A SULFUR-RECOVERY PROCESS

(75) Inventor: Scott Lynn, Pleasant Hill, CA (US)

(73) Assignee: The Regents of the University of California, Oakland, CA (US)

( * ) Notice: Subject to any disclaimer, the term of this patent is extended or adjusted under 35 U.S.C. 154(b) by 12 days.

(21) Appl. No.: 09/999,825

(22) Filed: Oct. 30, 2001

(65) Prior Publication Data

US 2003/0082096 A1 May 1, 2003

(51) Int. Cl.$^7$ .............................................. C01B 17/04

(52) U.S. Cl. ..................... 423/574.1; 423/220; 423/222; 423/224; 423/242.1; 423/242.2; 423/575; 423/542

(58) Field of Search ................................ 423/222, 224, 423/242.1, 242.2, 574.1, 575, 220, 542

(56) References Cited

U.S. PATENT DOCUMENTS

| | | | | |
|---|---|---|---|---|
| 3,953,586 A | | 4/1976 | Tanimura .................... | 423/575 |
| 4,053,575 A | * | 10/1977 | Haas et al. ................. | 423/575 |
| 4,056,606 A | * | 11/1977 | Germerdonk et al. ....... | 423/575 |
| 4,124,685 A | | 11/1978 | Tarhan et al. ............ | 423/574 L |
| 4,795,620 A | | 1/1989 | Heisel et al. ............... | 423/243 |
| 5,098,681 A | | 3/1992 | Christiansen et al. ....... | 423/243 |
| 5,397,556 A | | 3/1995 | Towler et al. .............. | 423/220 |
| 5,928,620 A | | 7/1999 | Lynn ....................... | 423/574.1 |

FOREIGN PATENT DOCUMENTS

| | | |
|---|---|---|
| EP | 0 127 206 A1 | 12/1984 |
| WO | WO 86/02628 A1 | 5/1986 |
| WO | WO 99/12849 A1 | 3/1999 |

OTHER PUBLICATIONS

Naber et al., "New Shell Process Treats Clause Off–gas," *Chemical Engineering Progress*, 69(12):29 (1973).
Kohl et al., "Gas Purification," (Third Edition), Gulf Publishing Company, Book Division, Houston, London, Paris, Tokyo (1979), pp. 771–773.
Yost et al., "Systematic Inorganic Chemistry," Prentice–Hall, Inc., New York (1946), pp. 398–399.
Lynn et al., "The University of California Sulfur Recovery Process: A New Approach," Presented at Sulphur 2000, Oct. 29–Nov. 1, 2000, San Francisco, CA—USA.
Lynn et al., "The University of California Berkeley's Sulfur Recovery Process: Claus Revisited," Presented at The Ninth Gas Research Institute, Sulfur Recovery Conference, Oct. 24–27, 1999, San Antonio, Texas.
Lynn, Scott, "Claus Revisited: the UC Sulfur Recovery Process," 1997 GRI Sulfur Recovery Conference, Austin, TX, Oct. 12–15.

(List continued on next page.)

*Primary Examiner*—Stanley S. Silverman
*Assistant Examiner*—Timothy C. Vanoy
(74) *Attorney, Agent, or Firm*—Townsend and Townsend and Crew LLP

(57) ABSTRACT

$H_2S$ is removed from an $H_2S$-rich gas, and sulfur is produced, by a process in which the $H_2S$-rich gas is reacted with $SO_2$ in a reactor in the presence of an organic solvent and a catalyst, an $H_2S$-containing off-gas is removed from the reactor and is combusted to produce an $SO_2$-rich combustion gas. Preferably, the reactor off-gas is combusted with a substoichiometric amount of oxygen so that the combustion gas also contains water vapor and sulfur vapor. The combustion gas is cooled by direct quench or indirect heat exchange to produce an aqueous stream comprising primarily water and containing suspended solid sulfur and polythionic acids, e.g., a Wackenroder's liquid, and the aqueous stream is used to provide cooling for the $H_2S$—$SO_2$ reaction. Problems associated with production and handling of Wackenroder's liquids are overcome and sulfur values in these materials are recovered.

25 Claims, 1 Drawing Sheet

OTHER PUBLICATIONS

Quinlan et al., "Technical and Economic Comparison of LO–CAT II™ With Other Iron–Based Liquid Redox Processes," Presented at 1992 GRI Liquid Redox Sulfur Recovery Conference, Oct. 4–6, 1992, Austin, Texas.

Neumann et al., "Kinetics of the Reaction of Hydrogen Sulfide and Sulfur Dioxide in Organic Solvents," *I. & E.C. Proc. Des. & Dev.*, 25:248(1986).

Sciamanna et al., "Sulfur Solubility in Pure and Mixed Organic Solvents," *I. & E.C. Research*, 27:485–491 (1988).

Lynn et al., "The University of California Sulfur Recovery Process: A New Approach To SRP Technology" presentation at the 2001 International Gas Research Conference; Nov. 8, 2001 (Amsterdam, The Netherlands).

* cited by examiner

METHOD OF RECOVERING SULFUROUS COMPONENTS IN A SULFUR-RECOVERY PROCESS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

FIELD OF THE INVENTION

The present invention relates to a process of removing hydrogen sulfide from natural gas or other industrial gas, in an integrated system where sulfur is produced.

BACKGROUND OF THE INVENTION

One of the most common systems for processing gases containing hydrogen sulfide and producing sulfur involves the use of well-known absorber-stripper steps to separate $H_2S$ and the well-known Claus process to produce sulfur. In such system, in simplified form, the basic steps are usually:

(a) $H_2S$ removal from sour gas, using an $H_2S$ absorbent, to obtain sweetened product gas.

(b) Stripping $H_2S$ out of the $H_2S$-rich absorbent to obtain $H_2S$.

(c) $H_2S$ combustion to obtain $SO_2$ and $H_2S$.

(d) Solid-catalyzed $H_2S$ reaction with $SO_2$ at high temperature to form and recover S and to make an off-gas containing reduced amounts of $H_2S$ and $SO_2$.

(e) Treating the off-gas from step (d) to recover as S a major fraction of the remaining amounts of $H_2S$ and $SO_2$ and to form a stack gas that may be released to the atmosphere.

Steps (c) and (d) in combination are often regarded as the Claus process.

A system that is directed to treating sour gas but does not include reaction of $H_2S$ to form sulfur is shown in FIGS. 14–25 of Kohl and Riesenfeld, Gulf Publishing Co., 1985 "Gas Purification", 3rd Edition. FIGS. 14–25 in the Kohl et al. reference shows the basic steps of (a) $H_2S$ removal from sour gas using an absorbent to take out the $H_2S$, so as to obtain treated (sweetened gas) of reduced $H_2S$ content out the top of the absorber or "contactor" and $H_2S$-rich absorbent out of the bottom of the absorber; and (b) stripping $H_2S$ out of the $H_2S$-rich absorbent, by a flash regeneration technique and a heated regeneration technique to strip $H_2S$ from the absorbent and obtain $H_2S$ and regenerated (lean) absorbent for reuse in step (a).

The system illustrated in the Kohl et al. reference uses a physical absorbent, such as propylene carbonate.

A chemical solvent could be used in that basic-type system, possibly without the flash regeneration part of step (b). Examples of known chemical-type absorbents include amines, such as monoethanolamine ("MEA").

Just as Kohl et al. reference at FIGS. 14–25 is directed to $H_2S$ absorption/stripping steps, also FIG. 5 from a paper by Lynn et al., "The University of California Berkeley's Sulfur Recovery Process: Claus Revisited", 1999 Sulfur Recovery Conference, Austin, Tex., Oct. 24–27, 1999, shows the resultant $H_2S$ from absorption/stripping can be routed to a reactor. The reactors illustrated in the October 1999 paper are used in combination with a Claus plant (see, for example, the furnace illustrated in FIG. 4). The $SO_2$-rich gas from the furnace is routed to the bottom of an $SO_2$ absorber column. The $SO_2$ is cooled in the bottom of the $SO_2$ absorber using a cooled organic solvent ($SO_2$ absorbent) that is recirculated, through a solvent quench heat exchanger, in a loop at the bottom of the $SO_2$ absorber.

The October 1999 paper also shows in FIG. 4 a process flow diagram for a typical Shell Claus Off-Gas Treatment (SCOT) unit. It is well known in the sulfur recovery industry that a SCOT unit may be used downstream of a Claus plant as a tail-gas clean-up unit (TGCU) to increase the recovery of sulfur from what otherwise would be achieved by only using a conventional Claus plant.

The FIG. 4 illustration of the SCOT unit shows steps including (a) combining a reducing gas with the Claus tail-gas, (b) reducing (hydrogenating) the tail gas containing $SO_2$, S, COS, and $CS_2$ in the SCOT reactor to obtain an $H_2S$-rich stream, (c) quenching the $H_2S$-rich stream by direct contact with water in a quench tower, (d) $H_2S$ absorption/stripping steps to produce an $H_2S$ stream, and (e) recycle of the $H_2S$ stream to the Claus plant. Thus, FIG. 4 of the October 1999 paper is an example of the use of a direct contact aqueous quench in a sulfur recovery process, though to cool an $H_2S$-rich gas, not an $SO_2$-rich gas, as in the present invention.

Another reference which illustrates a process similar to that shown in FIG. 4 from the October 1999 paper, is Naber et al. "New Shell Process Treats Claus Off-Gas", *Chemical Engineering Progress*, Vol. 69, No. 12, page 29, December 1973.

The Claus process itself, which consists of a series of reactors in which $SO_2$ and $H_2S$ react to form water and sulfur vapor. The reaction is equilibrium-limited at temperatures above the dew point of sulfur vapor. The gas stream leaving each reactor is near chemical equilibrium. In normal operation, most of the sulfur is condensed between reactors to allow further reaction in the next stage. However, in the Claus process, the condensers operate above the dew point of water to avoid forming Wackenroder's liquid (a dilute aqueous mixture of colloidal sulfur and a solution of sulfoxy acids; see Hackh's Chemical Dictionary, Fourth Edition, 1969) and the problems that their formation would present. This is done even though the presence of water vapor in the gas stream limits the extent of reaction that can be achieved and thus necessitates the installation of a tail-gas treatment process.

My prior International patent application WO 99/12849, which is hereby incoporated herein by reference, describes a process in which gaseous hydrogen sulfide ($H_2S$) reacts with gaseous sulfur dioxide ($SO_2$) in the presence of an organic liquid or solvent wherein the following reaction occurs:

$$2H_2S(g)+SO_2(g) \rightarrow 3S(l)+2H_2O(g) \tag{1}$$

In the reactor, it is desired to operate above the melting point of sulfur. The reacting gases may flow co-currently or counter-currently to a stream of the organic liquid. A preferred example of such a reactor is a tray-type column in which the reacting gases flow counter-currently to a stream of the organic liquid. The sulfur produced by Reaction (1) in either type of reactor forms a separate liquid phase that flows co-currently with the organic liquid.

The gaseous sulfur dioxide is produced by combustion of hydrogen sulfide. Preferably this combustion is conducted fuel-rich to avoid the risk of forming $SO_3$ and $NO_x$, both of which are undesirable. However, if the combustion is fuel-rich, then elemental sulfur forms in addition to $SO_2$ and will be condensed and partially dissolved in the solvent used in the $SO_2$ absorber, which is undesirable. On the other hand, if the combustion is carried out fuel-lean, the free oxygen that accompanies fuel-lean combustion can cause degradation of the solvent in the $SO_2$ absorber. Furthermore, water vapor is formed by the combustion of $H_2S$ and any hydrocarbons that are present in the acid gas fed to the furnace. Most of the water vapor will also condense in the solvent in the $SO_2$ absorber. The presence of water vapor together with the $SO_2$ requires additional cooling, or a higher solvent flow, in the absorber. In addition, that water must be boiled out of the solvent in the $SO_2$ stripper, thereby increasing the energy required in operating the stripper. Furthermore, most of this added water vapor must be condensed from the $SO_2$ leaving the stripper before the latter enters the reactor column to avoid an excessive vapor flow within the reactor column.

SUMMARY OF THE INVENTION

According to the present invention, a process is provided for removing $H_2S$ from an $H_2S$-rich gas and producing sulfur, which comprises:
(a) reacting $H_2S$ in the $H_2S$-rich gas with $SO_2$ to produce sulfur and a reactor off-gas containing $H_2S$ and $H_2O$;
(b) combusting the reactor off-gas to produce a combustion gas containing $SO_2$, water vapor;
(c) cooling the combustion gas from step (b) to condense water vapor and sulfur and produce an aqueous stream comprising primarily water; and
(d) introducing the aqueous stream from step (c) into the reactor to provide cooling for the reaction of step (a).

In one aspect, the invention comprises:
in a process for removal of $H_2S$ from an $H_2S$-rich gas, in which the $H_2S$-rich gas is reacted with $SO_2$ in a reactor in the presence of an organic liquid to produce sulfur, and in which $H_2S$ is combusted to produce a combustion gas containing $SO_2$, water vapor, and in which the $SO_2$ is thereafter reacted with the $H_2S$-rich gas, the steps comprising:
(a) cooling the combustion gas to condense water vapor and sulfur and produce an aqueous stream comprising primarily water; and
(b) introducing said aqueous stream into the reactor to provide cooling for the reaction between the $H_2S$-rich gas and the $SO_2$.

In another aspect, the invention comprises:
a process for removing $H_2S$ from an $H_2S$-rich gas and recovering sulfur, which process comprises feeding the $H_2S$-rich gas and an $SO_2$-rich gas, the $H_2S$ being in stoichiometric excess, to a reactor column in the presence of a solvent that catalyzes their reaction to form liquid sulfur and water vapor; wherein aqueous streams are injected at one or more points of the reactor column to absorb a part of the heat of reaction by water vaporization; wherein the $H_2S$-rich off-gas is scrubbed with an aqueous stream in the upper section of the reactor column to recover solvent vapor and unreacted $SO_2$ and is then cooled to condense water prior to combusting the $H_2S$-rich off-gas to produce $SO_2$ to be fed to the reactor column; absorbing $SO_2$ from the combustion gas by contacting the gas with an $SO_2$ absorbent in an absorber to obtain an $SO_2$-rich absorbent; and stripping $SO_2$ from the $SO_2$-rich absorbent to obtain an $SO_2$-rich gas; which process further comprises:
(a) burning the cooled $H_2S$-rich gas with an amount of $O_2$-rich gas in a furnace such that substantially all hydrogen is converted to $H_2O$, and at least 90%, preferably about 98% to 99%, of the sulfur is converted to $SO_2$ while at least 0.1%, preferably about 1% to 2%, of the sulfur is converted to S vapor;
(b) cooling the $SO_2$-rich gas from step (a) by direct contact with cooled water in a separate contacting device or water introduced into the lower part of the $SO_2$ absorber to condense $H_2O$ and S vapor to produce an aqueous slurry containing suspended sulfur and to obtain cooled $SO_2$-rich gas;
(c) absorbing $SO_2$ from the cooled $SO_2$-rich gas in an $SO_2$ absorber by contacting the gas with an $SO_2$ absorbent to obtain an $SO_2$-rich absorbent and a stack gas of low sulfur compound content; and stripping $SO_2$ from the $SO_2$-rich absorbent to obtain an $SO_2$-rich gas; and
(d) using the aqueous slurry from step (b) as one of the aqueous streams injected at one or more points of the reactor column to absorb a part of the heat of reaction by water vaporization.

DETAILED DESCRIPTION OF THE INVENTION

Figure 1:
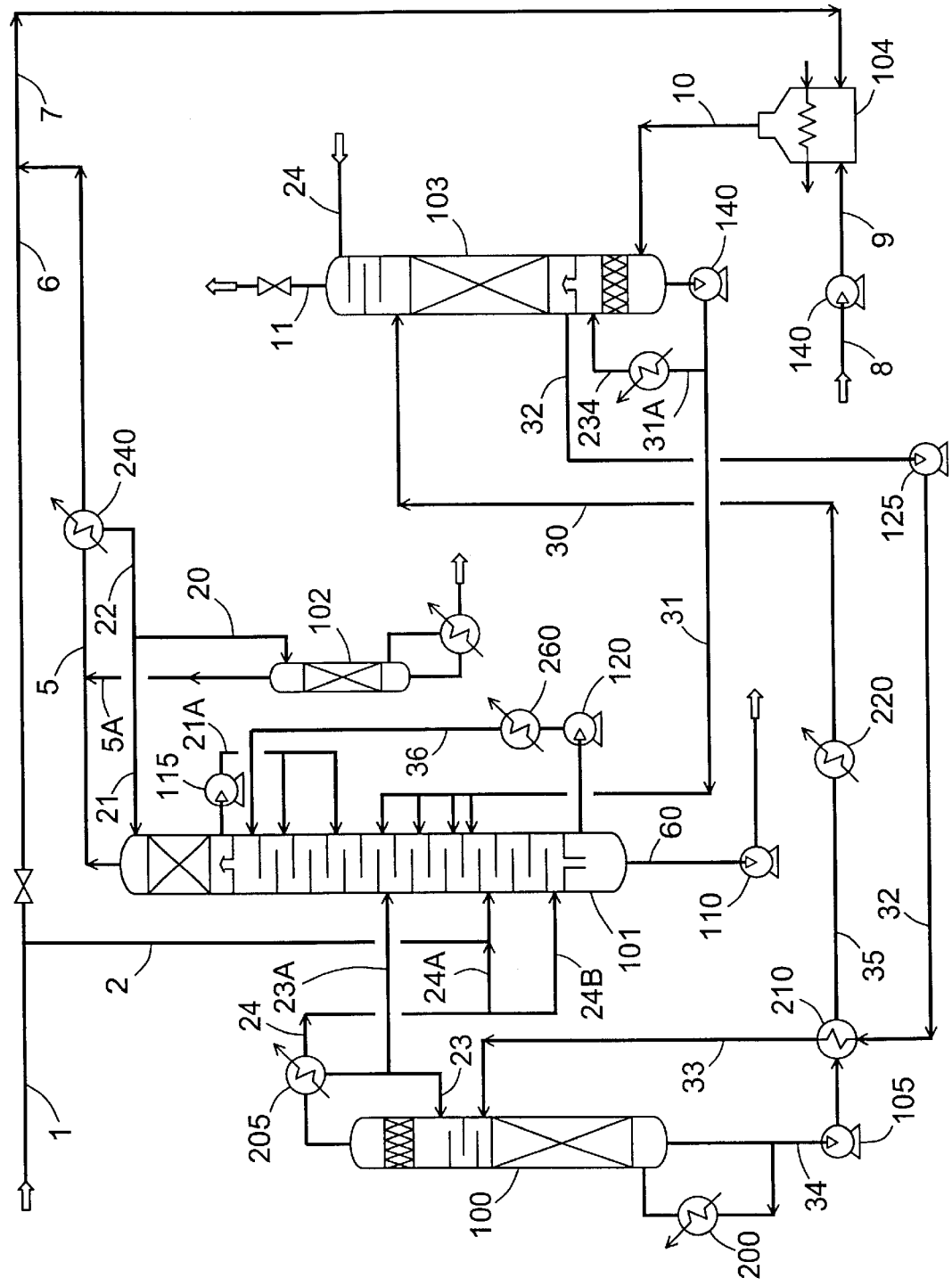
FIG. 1 is a flow sheet depicting an embodiment of the process of this invention.

According to the present invention, a process is provided for removing $H_2S$ from an $H_2S$-rich gas and producing sulfur, which comprises:
(a) reacting $H_2S$ from the $H_2S$-rich gas with $SO_2$ in a reactor column to produce sulfur and a reactor off-gas containing $H_2S$;
(b) combusting the reactor off-gas and preferably also any by-passed $H_2S$-rich gas to obtain an $SO_2$-rich gas containing water vapor and other gases;
(c) cooling the $SO_2$-rich gas and water vapor from step (b) to obtain a water stream; and
(d) injecting said water stream into the reactor column to provide a part of the cooling required in the reactor column.

Preferably, the reactor off-gas from step (a) is combusted in step (b) in a high-temperature combustion zone with a substoichiometric amount of oxygen or air to obtain an $SO_2$-rich gas that contains a minor amount of sulfur vapor. By substoichiometric is meant less than the amount of oxygen that is stoichiometrically required for complete combustion of the $H_2S$, hydrocarbons, organic sulfur compounds, CO and $H_2$ in the reactor off-gas to form $H_2O$, $SO_2$ and $CO_2$. This feature is particularly advantageous in the process of the present invention as the substoichiometric amount of oxygen helps avoid, or minimize, the formation of $SO_3$ in the combusted gas, and thus corrosion concerns are less, both in the cooling step for the $SO_2$-rich gas and in the reactor column. In addition, the substoichiometric amount of oxygen helps avoid or minimize the formation of $NO_x$. This helps achieve a better quality stack gas exiting the subsequent $SO_2$ absorption step. Finally, the substoichiometric amount of oxygen helps avoid or minimize the amount of free oxygen present in the cooled $SO_2$-rich combustion gas. This helps avoid or minimize the degradation of the organic solvent in the $SO_2$ absorber.

It is common practice in furnaces operated with commercial power plants to follow such a high-temperature, fuel-rich combustion stage with a lower-temperature, fuel-lean combustion stage to complete the oxidation process. That can be done in the process of the present invention if it is desired to oxidize the sulfur vapor in the combustion gas before it leaves the furnace section. However, in the process of the present invention it is preferred to have only a single, fuel-rich combustion operation because a) the combustion equipment and the combustion control are simpler, and hence less costly, and b) the substoichiometric amount of oxygen helps avoid or minimize the amount of free oxygen present in the cooled $SO_2$-rich combustion gas. This helps avoid or minimize the degradation of the organic solvent in the $SO_2$ absorber. However, as is noted below, such fuel-lean combustion can only be practiced if one has means for advantageously handling the resultant sulfur vapor in the combustion gas.

By "minor amount of sulfur" is meant relatively low amounts of sulfur compared to the $SO_2$ which is formed when the reactor off-gas is combusted, preferably less than five percent of the total sulfur, and more preferably less than 2 percent of the total sulfur in the $SO_2$-rich gas. Having a minor amount of sulfur present in the combusted reactor off-gas helps ensure that a substoichiometric amount of oxygen is used. The oxygen for the combustion most readily will be obtained using air.

In a preferred embodiment of the present invention, the process includes the following step:

(e) removing $SO_2$ from the cooled $SO_2$-rich gas to obtain a stack gas of low sulfur compound content.

Preferably in the process of the present invention, step (e) is carried out in an $SO_2$ absorber wherein $SO_2$ is removed from the cooled $SO_2$-rich gas by absorption into a solvent in the $SO_2$ absorber to obtain $SO_2$-rich solvent.

Also, it is preferred in the present invention that the $SO_2$ used in step (a) be in gaseous form and obtained at least in part by stripping $SO_2$ from the $SO_2$-rich solvent. In this embodiment the cooling of the $SO_2$-rich gas is carried out in the lower part of the $SO_2$ absorber.

Among other factors, the present invention is based on my concept and finding that the integrated process of the present invention employs a cooling of the wet $SO_2$-rich gas from an $H_2S$ combustion step, and condensation of the water and sulfur produced during combustion in such a way, that it provides an integrated use of the resulting aqueous liquid (i.e. colloidal aqueous suspension or slurry of sulfur) as a part of the coolant in the reactor column (first process step) of the present invention. Furthermore, by condensing water from the wet $SO_2$-rich combustion gas ahead of the $SO_2$ absorber the absorption of water vapor by the hydrophilic organic solvent in the absorber is minimized or prevented and the need subsequently to strip the water from the solvent in the $SO_2$ stripper is minimized or avoided.

The cooling of the $SO_2$-rich gas may be carried out with a conventional partial condenser, employing indirect heat exchange, to condense water from the wet $SO_2$-rich combustion gas ahead of the $SO_2$ absorber. It would then be necessary for the gas/liquid mixture that is formed to flow through a gas/liquid separator that included a demister section to separate water droplets from the gas before the gas stream entered the $SO_2$ absorber. The gas/liquid separator with demister section could be incorporated in the bottom section of the $SO_2$ absorber and would then preferably be separated from the solvent section by means of a "chimney tray", that allows passage of the $SO_2$-rich gas into the solvent section while preventing flow of solvent into the gas/liquid separation section below.

Preferably, the cooling of the $SO_2$-rich gas is accomplished, at least in part, by direct-contact cooling using a recycling water stream, also known as a water quench. In the process of the present invention, it is particularly preferred that the portion of recycling water stream that is used in step (d) is approximately equal to the net water produced in combustion step (a).

In the process of the present invention, preferably the cooling of the $SO_2$-rich gas is carried out by water introduced to the lower section of the $SO_2$ absorber, and $SO_2$-rich solvent is withdrawn from an intermediate section of the $SO_2$ absorber without having mixed with the water in the lower section of the $SO_2$ absorber. This is accomplished by having a demister at the top of the quench section plus a chimney tray that separates the two sections as described above. Thus, the recycling water preferably is a separate circulation loop at the bottom of the $SO_2$ absorber, as is schematically indicated in the drawing. Because of the demister and the chimney tray the recycling water contains little or no solvent and the recycling solvent contains little or no elemental sulfur.

It should be noted that in the present process, regardless of whether the $SO_2$-rich gas from the combustion step is cooled by direct contact in a water quench or by indirect heat exchange in a partial condenser, the temperature to which the $SO_2$-rich gas from the combustion step is cooled is limited by the temperature of the available cooling medium whether it be cooling water or ambient air. The $SO_2$-rich gas can typically be cooled to within about 5°–10° C. of the temperature of the available coolant; the approach temperature is chosen on the basis of an economic optimization by methods well known to those skilled in the art. A typical temperature range for the $SO_2$-rich gas entering the solvent section of the $SO_2$ absorber will be 25 to 40° C., with lower temperatures preferred if not economically prohibitive.

It should also be noted that in the present process, regardless of whether the $SO_2$-rich gas from the combustion step is cooled by direct contact in a water quench or by indirect heat exchange in a partial condenser, a dilute aqueous solution will be formed that contains colloidal elemental sulfur and sulfurous compounds. This aqueous mixture of colloidal sulfur and sulfurous compounds is sometimes referred to as "Wackenroder's liquid". Wackenroder's reaction is the reaction between $H_2S$ and $SO_2$ in aqueous solution to form colloidal sulfur and polythionic acids. (Regarding Wackenroder's reaction, see *Hackh's Chemical Dictionary*, 4th Edition, 1969, page 719. Regarding Wackenroder's liquid, see, for example, Yost et al. "Systematic Inorganic Chemistry", 1946, pages 398 and 399. Yost et al. point out that Wackenroder's liquid is complex and contains colloidal sulfur and various sulfurous compounds, including polythionic acids.) Hence, in this embodiment, in addition to the condensed sulfur at least some of the sulfurous compounds in the aqueous solution are polythionic acids. It should be noted that the various sulfurous compounds, including polythionic acids formed in Wackenroder's reaction are intermediates in the overall reaction between $H_2S$ and $SO_2$ that form when the reaction occurs in aqueous solution. In the organic solvent preferably employed in the present invention these intermediates are not detected; either they do not form or they react very rapidly to complete the reaction to elemental sulfur and water. Furthermore, if a small amount of Wackenroder's liquid is mixed with a large amount of the preferred solvent, so that the resulting solution does not exceed 10% water by weight, the polythionic acids complete the reaction to elemental sulfur very rapidly and the colloidal sulfur particles melt and either dissolve in the solvent or form a separate liquid phase.

In other processes it is generally desired to avoid formation of Wackenroder's liquid, and steps are generally taken in prior art sulfur recovery processes to avoid such formation, as discussed above.

Among other factors, the present invention is based on my concept and finding that the integrated process of the present invention, in one embodiment, advantageously embodies use of a direct water quench into $SO_2$-rich gas from an $H_2S$ combustion step and provides an integrated use of the resulting aqueous liquid (eg., Wackenroder's liquid) in the reactor column step of the present invention. Further, the resulting Wackenroder's liquid contains sulfurous components as well as sulfur, and these sulfurous components are converted to sulfur in the reactor column of the present invention. Still further, the Wackenroder's liquid is preferably used to provide a portion of the cooling in the reactor column.

Preferably in the present invention, the amount of colloidal sulfur and sulfurous compounds is at least 0.5 percent by weight (calculated as sulfur) of the total aqueous liquid. More preferably the amount of colloidal sulfur and sulfurous compounds in the Wackenroder's liquid formed in the process of the present invention is at least one percent (calculated as sulfur), most preferably 2–4 percent (calculated as sulfur) of the total aqueous liquid.

According to a preferred embodiment of the present invention, $SO_2$ is removed from the $SO_2$-rich gas using a lean solvent introduced to an upper part of the $SO_2$ absorber and $SO_2$-rich solvent is removed from an intermediate part of the $SO_2$ absorber. Preferably in the process of the present invention, the $SO_2$-rich solvent is stripped of $SO_2$ in an $SO_2$ stripper, and resulting $SO_2$ is fed to step (a) for reaction with the $H_2S$.

According to a preferred embodiment of the present invention, a second aqueous stream (a different stream from the Wackenroder's liquid described above) is injected in one or more points of the upper part of the reactor column (for example, as schematically illustrated in the drawing) to provide cooling in the reactor column, and to assist in solvent vapor recovery and unreacted $SO_2$ recovery.

In a sulfur recovery process of the type described in my prior patent application, WO 99/12849, which is one type of process in which the present invention may be employed, gaseous hydrogen sulfide ($H_2S$) reacts with gaseous sulfur dioxide ($SO_2$) in the presence of an organic liquid wherein the following reaction occurs:

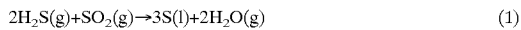

$$2H_2S(g)+SO_2(g) \rightarrow 3S(l)+2H_2O(g) \qquad (1)$$

The source of the $H_2S$-rich gas for the present invention may be a conventional absorber/stripper operation that removes $H_2S$ from a sour industrial gas, or may be an industrial operation that produces such a gas directly. In general, the higher the concentration of $H_2S$ in the $H_2S$-rich gas the better, but gases containing 20 vol % $H_2S$ or even lower can be processed by the method of this invention.

The solvent, also of the type described in my International Application, which patent application is incorporated herein by reference, is preferably miscible with water, has a low volatility, is a relatively good solvent for both reactants, catalyzes the reaction and is one in which liquid sulfur has a limited but low solubility. By low volatility is meant a normal boiling point of 150° C. or higher, preferably 180° C. or higher. A relatively good solvent is one in which the solubilities of both reactants exceed their respective solubilities in water by at least a factor of ten at 120° C. Low sulfur solubility is less than 10 percent weight sulfur, preferably lower, in the solvent at 120° C. Preferred solvents for the reactor column include polyethyleneglycol ethers, such as the methyl ether of triethylene glycol, the dimethyl ether of triethylene glycol, and the dimethyl ether of polyethylene glycol. The methyl ether of diethyleneglycol is particularly preferred for use in the reactor column in the process of the present invention. The solvent used in the reactor column may also be the catalyst for the reaction of $H_2S$ with $SO_2$ to form sulfur. However, according to a preferred embodiment of the present invention, a catalyst is added to the solvent to catalyze or enhance catalysis of the reaction of $H_2S$ with $SO_2$ to form sulfur. Preferred catalysts include N-substituted aromatic-ring compounds in which there is no moiety attached to a carbon adjacent to a ring nitrogen, such as pyridine, isoquinoline or 3-methyl pyridine. The compound 3-hydroxymethyl pyridine is a particularly preferred catalyst for use in the reactor column in the present invention.

In the reactor, one example of which is a packed column similar to those used in gas absorption, it is desired to operate above the melting point of sulfur. The reacting gases flow co-currently to a stream of the organic liquid. A preferred example of a reactor is a tray-type column in which the reacting gases may flow co-currently or counter-currently to a stream of the organic liquid. The sulfur produced in either type of reactor forms a separate liquid phase that flows co-currently with the organic liquid.

In the present invention, the furnace is preferably operated slightly fuel-rich and a quench operation (i.e., a partial condenser) provides for condensing a large fraction of the water in the combustion gas while avoiding the problem of sulfur collecting in the absorber solvent. The quench operation may employ either a conventional heat exchanger or a direct-contact stream of water. Further, the present invention utilizes condensate formed by cooling the combustion gas as cooling water in the reactor column.

An embodiment of the process of the present invention is shown in FIG. 1. At the bottom of the $SO_2$ absorber, a quench section is schematically shown. Preferably water is circulated in the quench section. At the bottom of the quench section, the water is pumped through a suitable heat exchanger, cooled, and most is returned to the top of the quench section. The net amount of water formed by combustion of the acid gas must be removed from the quench-circulation system. The furnace or combustion step preferably is operated with an $O_2$/fuel ratio that is about equal to the stoichiometric requirement to do the following: a) convert at least 95%, preferably about 98% to 99% of the $H_2S$ to $SO_2+H_2O$; b) convert at least 0.1%, preferably 5% or less, most preferably about 1% to 2% of the $H_2S$ to $S_2+H_2O$; and c) convert substantially all of the organic sulfur compounds to $SO_2+CO_2+H_2O$ and substantially all of the hydrocarbons and other combustibles to $CO_2+H_2O$. The $SO_2$ content of the combustion gas in the process of the present invention preferably is sufficiently high to prevent the formation of any substantial amount of soot, CO, COS, $CS_2$ or $H_2$ whereas the $S_2$ content is sufficiently high to prevent the formation of any substantial amount of $SO_3$ or $NO_x$. (Although the term "substantial" is a relative term, in the foregoing context and elsewhere in the present specification, the term "substantial" denotes less than 0.5 percent by weight, preferably less than 0.1 percent, and most preferably less than 100 ppm.) The composition of this combustion gas is markedly more oxidizing in nature than is the combustion gas in a conventional Claus furnace, in which only about one-third of the $H_2S$ has been converted to $SO_2$. In the latter case, because the gas is much more reducing in nature, the formation of soot, CO, COS, $CS_2$ and $H_2$ are much more strongly favored.

With a typical acid gas, the ratio of S to water is about 2% to 4% by weight when the combustion gas is quenched. Such a slurry is easily pumped since the sulfur particles are of colloidal dimensions and have no tendency to stick to piping or the vessel walls. Indeed, it is possible for the fraction of $H_2S$ burned to form sulfur vapor to be varied by a factor of 2 or even more without causing mechanical or chemical problems with the operation of the quench system in the process of the present invention. At the temperature of the quench, elemental sulfur is essentially non-volatile so that it can be completely removed from the combustion gas. The quantity of water condensed from the combustion gas forms roughly one-third of the amount required to provide the cooling in the reactor column described above.

As the combustion gas flows through the waste-heat boiler following the furnace, a small amount of the sulfur will be converted back to $H_2S$ by the reverse of Reaction (1) in the gas phase. In the quench section, this $H_2S$ will react with $SO_2$ and water to form a very dilute solution of sulfoxy acids, sometimes referred to as sulfonic acids, which, combined with colloidal sulfur, is known in the technical literature as "Wackenroder's liquid". This mixture would normally present a difficult disposal problem. However, in the process of this invention, the quench liquid is injected into the reactor column, usually into the solvent stream flowing through the reactor column, as part of the coolant water to absorb heat from Reaction (1). The volume of this coolant is small compared to the volume of solvent flowing through the reactor column, and the solvent is miscible with water. Upon injection, the colloidal sulfur mixes with and is dissolved by the solvent; the sulfoxy acids mix with the solvent and become part of the reacting system within the column, and the water evaporates as noted above.

It should be noted that, in general, the use of a partial condenser to cool a gas stream is not novel. However, in a preferred embodiment the present invention involves a combination of a partial condenser—in which water and sulfur vapors condense while $H_2S$ and $SO_2$ react—with a particular utilization of the resultant aqueous mixture in an integrated process that includes injection of the resultant aqueous mixture into the reactor column of the present invention so that there is no net aqueous effluent from the quench operation.

The reactor used in the process of the present invention is preferably a reactor column. The term "column" is used to denote that the reactor vessel is preferably a column of the type used in fractional distillation or gas absorption. Fractional distillation and gas absorption are well-known arts, and the basic form of such a column is well known: elongated vessels with trays or packing or even "bales" of material. The trays can be weep hole trays or bubble cap trays. Regardless of the internals, in the preferred embodiment the basic concept is to have countercurrent flow, with liquids traveling downward and vapors upward. Absorption occurs in an absorption column as certain components in the entering gas mixture are absorbed by a solvent descending from overhead. In the preferred reactor column of the present invention, liquid solvent flows downward and gases including $H_2S$ and $SO_2$ flow upward. Parts of the $H_2S$ and $SO_2$ are dissolved in the organic solvent and the $H_2S$ reacts with the $SO_2$ in the liquid phase to form sulfur and water vapor. As a stoichiometric excess of $H_2S$ is used relative to $SO_2$, the gas exiting the reactor column still contains unreacted $H_2S$, and the gas is referred to as an $H_2S$-rich off-gas.

The term "$H_2S$-rich off-gas" is used herein not only for the gas exiting the top of the reactor column, but also is used to follow that gas stream through the reactor column overhead system and into the furnace. The overhead system preferably will include, in the process of the present invention, a cooling step, to generate "reflux" condensate for the reactor column (reflux being another aspect common to gas absorption and fractional distillation).

Referring again to the reaction of $SO_2$ with $H_2S$ in the reactor column, at least part of the $SO_2$ preferably enters the column a tray or two below the entry of the $H_2S$-containing stream so that the liquid sulfur is stripped of $H_2S$ before it leaves the column. At the bottom of the column, the two liquids are separated by decantation, the organic liquid is recycled to the top of the column whereas the liquid sulfur forms a product of the process. The walls of the reactor column and of the piping through which liquid flows preferably are heated as necessary to maintain a temperature in the range 120° C.–150° C., preferably between 125° C.–140° C., to prevent deposit of solid sulfur.

The temperature inside the reactor preferably is maintained in the range 120° C.–150° C., more preferably in the range 125° C.–140° C. Preferably, the temperature is maintained by injecting water at one or more points in the column. The evaporation of the water absorbs most of the heat of the reaction; the energy released by Reaction (1) is about 3.4 times the molar heat of vaporization of $H_2O$. Preferably, a heat exchanger is used in the solvent pump-around line to remove part of the heat of reaction during operation, as well as to heat the system prior to startup. The reactor column preferably operates at a pressure nominally equal to that of the $H_2S$ stripper, of the order of 1.5 to 3 atmospheres absolute. However, the reaction pressure is not limited to that range but could be as high as 5 atmospheres when using conventional equipment. The higher the pressure, the more rapid will be the reaction between the two gases.

In the process of the present invention, preferably $H_2S$ is in excess relative to $SO_2$ at all points above the entry of the $H_2S$-rich gas to the reactor column, and the unreacted $H_2S$, together with any co-absorbed components that are inert in the reaction, leaves the column, preferably after passing through a scrubbing section to recover solvent vapor and preferably after a cooling section to condense water vapor. Any $SO_2$ in the gas leaving the solvent section of the reactor column reacts very rapidly with $H_2S$ in the water-scrubbing section via Reaction (1), forming a very dilute Wackenroder's liquid (described above). The aqueous mixture leaving the scrubbing section is injected back into the reactor column as part of the coolant. The condensate is sent to a sour-water stripper where it is freed of dissolved $H_2S$ and becomes a product of the process.

FIG. 1 is a simplified process-flow diagram that shows the major components and general operating conditions of one embodiment of the process of the invention. FIG. 1 illustrates the use of a reactor column employing counter-current flow of the gases and liquids, with the liquid streams flowing down and the gases flowing up. The counter-current column can employ packing or more preferably trays such as are used in gas absorption columns. To facilitate the description, items of equipment are given three-digit numbers whereas streams are given one- or two-digit numbers. A given stream maintains the same number as it flows through pumps and heat exchangers as long as its composition is unchanged. In the description below the numbers referring to streams are between parentheses whereas the numbers referring to items of equipment are without parentheses.

In FIG. 1 a stream of $H_2S$-rich gas, (1), that is typical of a stream recovered from a sour industrial gas by an absorber/stripper operation (not shown), enters the system. A major fraction of stream (1) is sent via stream (2) to Reactor Column 101. A minor fraction of stream (1) bypasses Reactor Column 101 via stream (6). Stream (6) is preferably 30% or less of stream (1), is more preferably 20% or less of stream (1), and is most preferably 15% or less of stream (1). The $SO_2$-rich stream fed to Reactor Column 101 is stream (24). The source of stream (24) is $SO_2$ Stripper 100, the operation of which is discussed below. Preferably at least part of the $SO_2$-rich stream (24A) enters Reactor Column 101 at the same level as $H_2S$-rich stream (1) whereas a smaller part of the $SO_2$-rich stream (24B) enters Reactor Column 101 one or two trays below $H_2S$-rich stream (1) and serves to strip and react away dissolved $H_2S$ from the descending sulfur and solvent streams before they exit from Reactor Column 101. The solvent stream fed to Reactor Column 101 is stream (36), which has been decanted from sulfur stream (60) at the bottom of Reactor Column 101. By regulating the fraction of the part of the $SO_2$-rich stream flowing in stream (24B) only minor amounts of $SO_2$ are present in solvent stream (36) and sulfur stream (60). During normal operation solvent stream (36) is pumped by Pump 120 through Heat Exchanger 260 and is cooled to a temperature of about 120° C. During start-up of the system, steam is supplied to Heat Exchanger 260 to preheat the solvent before the start of operations.

Solvent stream (36) enters near the top of Reactor Column 101, below the waterwash section described below. The two gaseous reactant streams, (2) and (24), combine near the bottom of Reactor Column 101 and the reactants are absorbed by and react in the solvent phase to form water vapor and a second liquid phase of elemental sulfur. In addition, coolant water is injected into the solvent at various points along Reactor Column 101 and in turn vaporizes from the solvent so that the desired range of temperatures is maintained. At the bottom of Reactor Column 101 the liquid streams flow into a liquid/liquid separator section. Liquid sulfur settles rapidly to the bottom of the section. The two liquids are decanted; the sulfur is one of the products of the process, stream (60), and is removed via pump (110) whereas the solvent stream (36) flows to Pump 120 as noted above.

In the top section of Reactor Column 101 gas stream (5) is scrubbed with aqueous stream (21) to remove solvent vapor, react away residual $SO_2$ and provide coolant as noted above. $H_2S$ and $SO_2$ react very rapidly in water to form colloidal sulfur and various sulfoxy acids as noted above so that gas stream (5) is free of both solvent vapor and residual $SO_2$ when it enters Heat Exchanger 240. Most of the water is condensed from stream (5) and is separated in a sour aqueous stream (22) that is split into streams (20) and (21). Dissolved $H_2S$ is stripped from stream (20) in Sour Water Stripper 102 and stream (20) becomes the pure water product from the process. The off-gas from Stripper 102, a very'small stream (SA), is combined with the reactor off-gas, stream (5), which flows to Heat Exchanger 240. Scrubbing water, stream (21), is separated from stream (22) and fed to the scrubbing section at the top of Reactor Column 101 as noted above. The scrubbing liquor leaving the scrubbing section is conveyed via pump (115) and line 21A and injected into the solvent at various points along Reactor Column 101 as noted above.

The cooled $H_2S$-rich gas, stream 5, from Heat Exchanger 240 combines with Reactor By-Pass Gas stream (6) to become stream (7), the $H_2S$-rich feed to -Furnace 104. The air flow to Furnace 104, stream (8, 9), is provided by Blower 140. The furnace preferably is operated with an $O_2$/fuel ratio that is about equal to the stoichiometric requirement for converting about 98% to 99% of the $H_2S$ to $SO_2+H_2O$, preferably about 1% to 2% of the $H_2S$ to $S_2+H_2O$, substantially all of the organic sulfur compounds to $SO_2+CO_2+H_2O$ and substantially all of the hydrocarbons and other combustibles to $CO_2+H_2O$. The $SO_2$ content of the combustion gas in the process of the present invention preferably is sufficiently high to prevent the formation of any substantial amount of soot, CO, COS, $CS_2$ or $H_2$ whereas the $S_2$ content is sufficiently high to prevent the formation of any substantial amount of $SO_3$ or $NO_x$.

As the combustion gas flows through the waste-heat boiler following Furnace 104 and is cooled, a small amount of the sulfur is converted back to $H_2S$ by the reverse of Reaction (1) in the gas phase. Gas stream (10), which is at a temperature of about 150° C., then enters the quench section at the bottom of $SO_2$ Absorber 103. In the quench section stream (10) is cooled to near ambient temperature and the sulfur vapor and most of the water vapor formed by the combustion are condensed by quench stream (31A, 234). The heat absorbed by quench stream (31A) is removed in Heat Exchanger 230. The $H_2S$ in stream (10) will react with $SO_2$ and water in the quench operation to form a very dilute solution of sulfoxy acids, which, combined with colloidal sulfur, is known in the technical literature as "Wackenroder's liquid". The net material condensed in the quench operation leaves the quench section of $SO_2$ Absorber 103 in stream (31) arid becomes a part of the coolant supplied to Reactor Column 101. The cooled $SO_2$-rich gas flows counter-currently to the cooled solvent stream (35) in $SO_2$ Absorber 103 and the $SO_2$ is absorbed to form $SO_2$-rich solvent stream (32). The relative quantities of cooled solvent stream (35, 30), cooled $SO_2$-rich stream (10) and the height of $SO_2$ Absorber 103 are such that the stack gas, stream (11), leaving $SO_2$ Absorber 103 meets ambient air-quality standards, typically 100 parts per million $SO_2$ or less. A small water stream (24) washes solvent vapor from the stack gas at the top of $SO_2$ absorber 103. Stream (32) is p heated in Heat Exchanger 210 by lean solvent stream (34) and flows to $SO_2$ Stripper 100.

In $SO_2$ Stripper 100 the rich solvent flows counter-currently to the stripping vapor generated in Reboiler 200. A major fraction of that vapor consists of water that has been boiled from the only-moderately volatile solvent, and that was added as reflux stream (23) at the top of the column. Reflux stream (23) also serves the purpose of scrubbing solvent vapor from the $SO_2$-rich gas stream (24) leaving the top of $SO_2$ Stripper 100. $SO_2$-rich gas stream (24) then passes through Condenser 205, where a major fraction of the water content condenses to form stream (23). $SO_2$-rich solvent stream (32) typically contains somewhat more water than lean solvent stream (34); this excess water is sent to Reactor Column 101 in stream (23A) to act as coolant. Hot, lean solvent, stream (34), leaves the bottom of $SO_2$ Stripper 100 and is pumped by Pump 105 back to $SO_2$ Absorber 103 by way of Heat Exchangers 210 and 220, being cooled in the process.

EXAMPLE

Referring to FIG. 1, stream (1) has an hourly flow of 222 kmol $H_2S$, 107 kmol $CO_2$, 0.7 kmol $CH_4$ and 0.3 kmol $H_2O$. The daily production of liquid sulfur is 170 tonnes (1 tonne=1000 kg). Stream (2), the H$_2$S-rich feed to Reactor Column 101, constitutes the entire flow of stream (1). Stream (24) feeds 73.8 kmol/hr SO$_2$ to Reactor Column 101. Reactor Column 101 consists of 12 theoretical stages resembling those in a bubble-cap gas absorption column. The solvent flow through Reactor Column 101, stream (36), is 350 kmol/hr. The solvent is diethylene glycol methyl ether. On the feed tray for the H$_2$S-rich feed to Reactor Column 101 about 54% of the SO$_2$ reacts. On the top stage about 0.6% of the SO$_2$ reacts, for a total of 99.7%, and 74.4 kmol/hr H$_2$S remain in the reactor off-gas, stream (5). The total reactor coolant, streams (31)+(22), contains 155 kmol/hr H$_2$O, 31 kmol/hr solvent and 1.4 kmol/hr S. Condenser 250 separates about 350 kmol/hr H$_2$O from the reactor off-gas; about 150 kmol/hr is fed via stream (21) to the scrub section at the top of Reactor Column 101 and about 200 kmol/hr passes through Sour Water Stripper 102 and becomes a product of the process, stream (20).

The air flow to Furnace 104, stream (9), contains 424.7 kmol/hr N$_2$, 112.5 kmol/hr O$_2$ and 9.4 kmol/hr H$_2$O (assuming 50% relative humidity). The adiabatic flame temperature is about 1400° C. (2560° F.). The quantity of sulfur vapor is 0.75 kmol/hr; there is no CO, COS, CS$_2$ or H$_2$ in the combustion gas. The combustion gas, stream (10), also contains 73.8 kmol/hr SO$_2$, 108 kmol/hr CO$_2$ and 95.4 kmol/hr H$_2$O in addition to the nitrogen in the air.

The quench stream (31A) contains 2500 kmol/hr H$_2$O and 31 kmol/hr S; the net quench liquid, stream (31), contains 61 kmol/hr H$_2$O and 0.75 kmol/hr S. The flow of solvent through SO$_2$ Absorber 103 is 750 kmol/hr; SO$_2$ Absorber 103 has 6 theoretical stages for the quench section and 12 theoretical stages for the solvent section. The lean solvent, stream 35, is diethylene glycol methyl ether and contains about 4 wt % water. The stack gas, stream 11, from SO$_2$ Absorber 103 contains 0.044 kmol/hr (80 ppmv) SO$_2$.

SO$_2$ Stripper 100 has 12 theoretical stages for the stripping section and 2 stages above the solvent feed stage for the reflux section. The vapor flow from the reboiler is 230 kmol/hr H$_2$O and 20 kmol/hr solvent. The amount of SO$_2$ in the lean solvent is 0.0022 kmol/hr, 0.003% of that entering in stream 33. Reflux stream 23 is 93 kmol/hr H$_2$O.

What is claimed is:

1. A process for removing H$_2$S from an H$_2$S-rich gas and producing sulfur, which comprises:
    (a) reacting H$_2$S from the H$_2$S-rich gas with SO$_2$ in a reactor to produce sulfur and a reactor off-gas containing H$_2$S and H$_2$O;
    (b) combusting the reactor off-gas to produce a combustion gas containing SO$_2$, water vapor, and sulfur vapor;
    (c) cooling the combustion gas from step (b) to condense water vapor and sulfur vapor and produce an aqueous stream containing sulfur; and
    (d) introducing the aqueous stream from step (c) into the reactor to provide cooling for the reaction of step (a).

2. A process in accordance with claim 1 wherein the aqueous stream from step (c) comprises primarily water.

3. A process in accordance with claim 1 wherein the cooling of the combustion gas is performed with a direct water quench.

4. A process in accordance with claim 1 wherein the cooling of the combustion gas is performed by indirect heat exchange with a cooling medium.

5. A process in accordance with claim 1 which further comprises:
    (e) removing SO$_2$ from the cooled combustion gas to obtain a stack gas containing 100 ppm or less of SO$_2$.

6. A process in accordance with claim 5 wherein step (e) is carried out in an SO$_2$ absorber wherein SO$_2$ is removed from the cooled combustion gas by absorption into a solvent to obtain SO$_2$-rich solvent.

7. A process in accordance with claim 6 wherein SO$_2$ used in step (a) is obtained at least in part by stripping SO$_2$ from the SO$_2$-rich solvent.

8. A process in accordance with claim 7 wherein the cooling of step (c) is carried out in the lower part of the SO$_2$ absorber.

9. A process in accordance with claim 8 wherein the cooling of step (c) is performed with a direct water quench.

10. A process in accordance with claim 6 wherein SO$_2$ is removed from the combustion gas using an SO$_2$-lean solvent introduced into an upper part of the SO$_2$ absorber and wherein SO$_2$-rich solvent is removed from an intermediate part of the SO$_2$ absorber.

11. A process in accordance with claim 1 wherein step (a) is conducted in the presence of a solvent; the reactor off-gas, before leaving the reactor, is contacted with a second aqueous stream to recover solvent vapor, unreacted SO$_2$ reacts with H$_2$S in the reactor off-gas in the presence of the water contained in the second aqueous stream to produce a third aqueous stream comprising primarily water and containing suspended sulfur, and wherein the third aqueous stream is introduced into the reactor to provide cooling for the reaction of step (a).

12. A process in accordance with claim 1 wherein the amount of sulfur in the aqueous stream from step c) is from about 0.1 to about 10 percent by weight.

13. In a process for removal of H$_2$S from an H$_2$S-rich gas, in which the H$_2$S-rich gas is reacted with SO$_2$ in a reactor in the presence of an organic liquid to produce sulfur, and in which H$_2$S is combusted to produce a combustion gas containing SO$_2$, water vapor and gaseous sulfur, and in which the SO$_2$ is thereafter reacted with the H$_2$S-rich gas, the steps comprising:
    (a) cooling the combustion gas to condense water and sulfur vapor and produce an aqueous stream comprising primarily water and containing suspended sulfur; and
    (b) introducing said aqueous stream into the reactor to provide cooling for the reaction between the H$_2$S-rich gas and the SO$_2$.

14. A process in accordance with claim 13 wherein the cooling of the combustion gas is performed with a direct water quench.

15. A process in accordance with claim 13 wherein the cooling of the combustion gas is performed by indirect heat exchange with a cooling medium.

16. A process in accordance with claim 13 which also comprises:
    (c) removing SO$_2$ from the cooled combustion gas to obtain a stack gas containing 100 ppm or less SO$_2$.

17. A process in accordance with claim 16 wherein step (c) is carried out in an SO$_2$ absorber having an upper portion and a lower portion, wherein SO$_2$ is removed from the cooled combustion gas by absorption into a solvent to obtain SO$_2$-rich solvent.

18. A process in accordance with claim 17 wherein SO$_2$ that is reacted with the H$_2$S-rich gas is obtained at least in part by stripping SO$_2$ from the SO$_2$-rich solvent.

19. A process in accordance with claim 17 wherein the cooling of the combustion gas is carried out in the lower portion of the SO$_2$ absorber.

20. A process in accordance with claim 19 wherein the cooling of the combustion gas is performed with a direct water quench.

21. A process in accordance with claim 17 wherein $SO_2$ is removed from the combustion gas using an $SO_2$-lean solvent introduced into an upper part of the $SO_2$ absorber and wherein $SO_2$-rich solvent is removed from an intermediate part of the $SO_2$ absorber.

22. A process in accordance with claim 13 wherein the reaction between the $H_2S$-rich gas and the $SO_2$ is conducted in the presence of a solvent to produce a reactor off-gas; the reactor off-gas, before leaving the reactor, is contacted with a second aqueous stream to recover solvent vapor, unreacted $SO_2$ reacts with $H_2S$ in the reactor off-gas in the presence of the water contained in the second aqueous stream to produce a third aqueous stream comprising primarily water and containing suspended sulfur, and wherein the third aqueous stream is introduced into the reactor to provide cooling for the reaction of the $H_2S$-rich gas with the $SO_2$.

23. A process in accordance with claim 13 wherein the amount of sulfur in the aqueous stream is from about 0.1 to about 10 percent by weight.

24. A process for removing $H_2S$ from an $H_2S$-rich gas and producing sulfur, which comprises feeding the $H_2S$-rich gas and an $SO_2$-rich gas, the $H_2S$ being in stoichiometric excess, into a reactor column in the presence of a solvent that catalyzes their reaction to form liquid sulfur and water vapor; wherein a first aqueous stream is injected at one or more points of the reactor column to absorb a part of the, heat of reaction by water vaporization; wherein the $H_2S$-rich off-gas is scrubbed with a second aqueous stream in the upper section of the reactor column to recover solvent vapor and unreacted $SO_2$ and is then cooled to condense water; combusting the $H_2S$-rich off-gas to produce $SO_2$ to be fed to the reactor column; absorbing $SO_2$ from the combustion gas by contacting the gas with an $SO_2$ absorbent in an absorber to obtain an $SO_2$-rich absorbent; and stripping $SO_2$ from the $SO_2$-rich absorbent to obtain an $SO_2$-rich gas; which process further comprises:

(a) burning the cooled $H_2S$-rich off-gas with an amount of $O_2$-rich gas in a furnace such that, substantially all hydrogen is converted to $H_2O$, and at least 90% of the sulfur is converted to $SO_2$ while at least 0.1% of sulfur is converted to sulfur vapor;

(b) cooling the $SO_2$-rich gas from step (a) by direct contact with cooled water to produce an aqueous slurry containing solid sulfur;

(c) absorbing $SO_2$ from the cooled $SO_2$-rich gas in an $SO_2$ absorber by contacting the gas with an $SO_2$ absorbent to obtain an $SO_2$-rich absorbent;

(d) stripping $SO_2$ from the $SO_2$-rich absorbent to obtain an $SO_2$-rich gas; and (e) using the slurry of solid sulfur suspended in water from step (b) as a part of the first aqueous stream injected at one or more points of the reactor column to absorb a part of the heat of reaction by vaporization.

25. A process for removing $H_2S$ from an $H_2S$-rich gas and producing sulfur, which comprises:

(a) reacting $H_2S$ from the $H_2S$-rich gas with $SO_2$ in a reactor in the presence of an organic liquid to produce sulfur and a reactor off-gas containing $H_2S$ and $H_2O$, wherein the $SO_2$ is introduced into the reactor as a gas;

(b) combusting the reactor off-gas to produce a combustion gas containing $SO_2$ and water vapor;

(c) cooling the combustion gas from step (b) to condense water vapor and produce an aqueous stream;

(d) recovering $SO_2$ from the cooled combustion gas;

(e) introducing $SO_2$ from step (d) into the reactor as the $SO_2$ gas of step (a); and (f) introducing the aqueous stream from step (c) into the reactor to provide cooling for the reaction of step (a).

* * * * *